T. PARKINSON.
BROKEN GRANULAR MATERIAL AND GRAIN PURIFYING MACHINE.
APPLICATION FILED NOV. 10, 1919.
1,348,043.
Patented July 27, 1920.
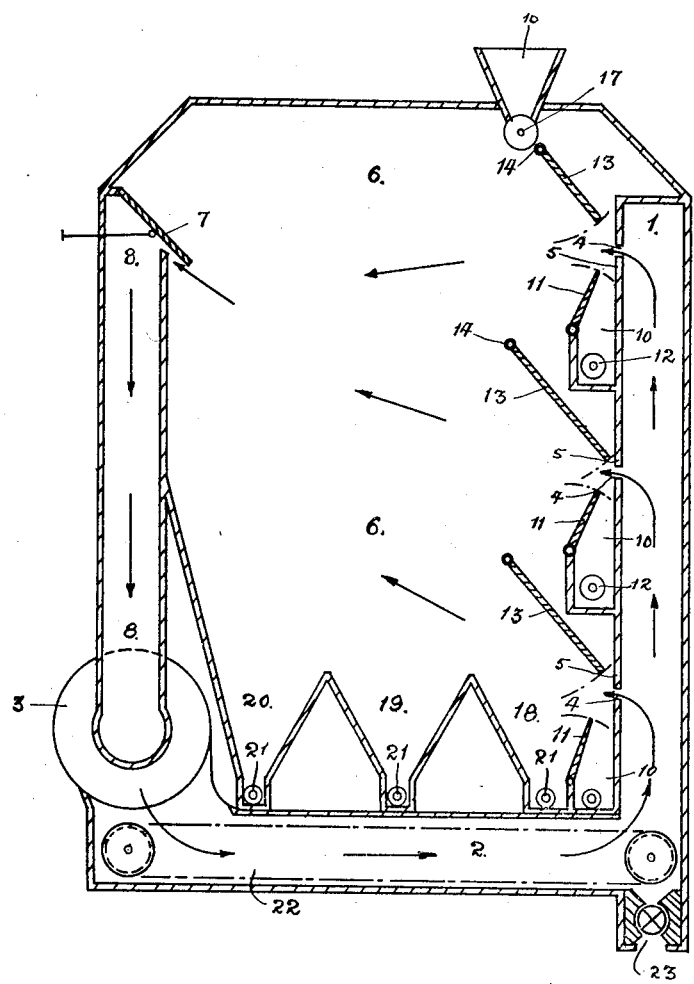
Inventor
Tom Parkinson
by
Attorney

UNITED STATES PATENT OFFICE.

TOM PARKINSON, OF DUNSTON-ON-TYNE, ENGLAND.

BROKEN-GRANULAR-MATERIAL AND GRAIN PURIFYING MACHINE.

1,348,043.   Specification of Letters Patent.   Patented July 27, 1920.

Application filed November 10, 1919. Serial No. 336,927.

*To all whom it may concern:*

Be it known that I, TOM PARKINSON, a subject of the King of England, and residing at Dunston-on-Tyne, in the county of Durham, England, have invented Improvements in and Connected with Broken-Granular-Material and Grain Purifying Machines, of which the following is a specification.

This invention has reference to purifying broken granular material, such as semolina, middlings, and the like, but it is also partly applicable for cleaning or purifying grains, such as wheat and like cereals; but for convenience it will be described as applied to the first mentioned purpose, namely, purifying semolina, middlings, and the like.

The invention relates more particularly to that method of purifying or cleaning material of the kind referred to in which the material is acted upon by an air current at a plurality of points one below the other, and the lighter material and dust is carried forward by the stream of air into a deposit chamber or part of the apparatus, and the heavier portion falls down, and is carried away by a conveyer or like means; and at the same time a less dense or heavy portion of the material is moved by the air so as to fall at a point farther toward the direction of the blast, and is caught and conducted again down on to a similarly aspirating arrangement and appliances by which it is caught in the manner above referred to, and this may be repeated three or more times, while the dust and other like impurities, according to their different specific gravity fall down into, and are collected by different hoppers or like receiving parts at the bottom or lower part of the machine; and the air almost ridded of dust and impurities leaves the apparatus at the point removed from the entrance or opposite same, and by a fan is re-delivered to the aspirating jet nozzles or apertures referred to.

According to the present invention a single fan or air blower is adapted to move the air, and the aspirating air nozzles or apertures are disposed one above the other in a common plus pressure vertical air trunk or chamber, such apertures or nozzles being of predetermined or regulated area, and being preferably horizontal slots, or rows of apertures.

Beneath each of these apertures or nozzles is a receptacle and a conveyer for receiving the heavier portion of the material which is not blown or forced by the current of air issuing from the jets or apertures into the apparatus, and this receiving part has a regulatable side or "board" by which the width of the receiving area, and distance of its upper edge from the entrance orifice of the air jet, is controlled and varied at will, so that it will catch more or less of the heavier material accordingly as its upper edge or part is farther from or closer to the said orifices.

This slide or board may be suitably supported on a hinge at its lower edge, upon which it is adapted to rock; and the receiving conveyer trunk will be directly within it and below.

At a point farther inward from the air apertures or nozzles, is a board or partition which is adjustable, the upper end being say mounted on a pivot about which it can be adapted to rock, while its lower end is comparatively near the level of the air current nozzle or apertures below it, so that the material which falls between the first mentioned regulatable board or receiving partition, and this latter board or partition, is conducted down to the second aspirating air nozzle or apertures where it is again treated by a stream of air in the manner referred to, and the heavier or medium weight of material and the lighter, are caught, regulated, and conducted to another air aspirating nozzle or apertures similarly as above described; and this process may be repeated as often as required; and finally the final heavier portion is collected in a manner similar to the other heavy matters, below the air supply nozzle or apertures and a regulatable board, and the lighter dust or impurities are collected in a space beyond it; while beyond all these parts the dust or lighter matters projected into the interior of the apparatus or depositing chamber portion, which is relatively long, will be deposited in hopper shaped bottom portions, and carried away as desired.

The invention will be further described, with the aid of the accompanying diagrammatic drawing, showing the machine in sectional elevation.

In the drawing, 1 represents a common air trunk which is fed or supplied with air through a horizontal trunk 2, by a single fan 3, air being maintained under a plus pressure in the trunk 1.

In this drawing, the plurality of horizontal slits or nozzles 4 are provided in its front wall 5, there being 3 in the case shown; and the air is projected at a suitable plus-pressure more or less horizontally through these slits or nozzles into the main and relatively large chamber 6, within which the matter or substances removed from the grain or broken material are separated by gravity from the air and deposited; and 7 is a valve at the opposite end of the machine, through which the air, almost ridded of dust and separated particles or matters, passes from the chamber 6, and enters the inlet or suction trunk 8 of the fan 3.

Below each of the nozzles 4 there is a trough 10, having at its outer upper edge, a pivoted board or part 11, by which the degree of opening between the wall 5 and this board, is regulated and varied at will.

Each of the troughs 10 has a worm or other conveyer 12 in it, by which the material falling into them is conveyed away.

Outside the troughs are deflectors or catch and direction boards 13, hinged at their upper outer ends at 14, and operating in connection with the face of the wall 5, by which any of the heavier falling particles forced beyond the troughs 10 by the blasts of air through the nozzles 4, are caught and conducted back toward and delivered directly above the nozzle or slit 4 next beneath it, so that all such heavier or heavy broken material or grain is again aspirated, and the operations upon it repeated a plurality of times.

After being aspirated by the lowest blast of air, the heavier material falling into the lowermost trough 10 is carried away in the same way as that in the upper troughs.

The material is supplied through the hopper or spout 16, and fed say by a feeding roller 17, or other means onto the upper hinged directing board 13, above the uppermost nozzle or slit 4.

In passing over the aspirating blasts or jets, lighter material is forced away, and the heavier material falls into the worm troughs 10; while the light impure or semi-impure material and "screenings," which are carried over and beyond the deflectors and the tailings trough below, passes into the interior chamber 6, which is common to all the aspirating arrangements above specified, and is relatively large, and falls on to inclined boards or hopper formation at the lower part of same, where it falls into troughs or channels, and is carried away.

With regard to the dust and lighter impurities which gravitate out of the air in the chamber 6, these fall in different grades into hopper shaped bottom portions 18, 19 and 20, each of which has a worm or other conveyer 21 in its bottom, for carrying away the deposited material. These different hopper receptacles will receive material of different gravities as will be understood, so that the removed or impure matters will be graded, and so delivered.

The air trunk 2 is shown provided with a creeper conveyer 22 in it, by which any dust or other matters deposited within it will be conveyed to the rotary trapped discharge device 23 at the bottom of the trunk 1.

By the collecting and deflecting boards, the material is caused to pass closely over the air blast nozzles or apertures 4 and powerful aspirating effects are produced; while if the feed regulating board or device is moved farther from the air nozzle or apertures, less aspirating power is provided, so that any power desired, and aspirating effects, at the different nozzles or points of aspiration, can be produced.

By this invention also, not only can good and advantageous purifying effects be produced, but it furnishes a relatively simple and inexpensive machine.

What is claimed is:—

1. In a material separating and grading machine, a casing, an air pressure conduit adjacent one side of the casing, hoppers supported in superimposed relation on the wall of said conduit, that wall of each hopper remote from the conduit having its upper portion adjustable to and from the conduit wall to vary the entrance opening to the hopper, the conduit wall being formed above each hopper with a blast opening, and deflecting boards supported in the casing beyond each hopper with their lower ends adjustable to and from the wall of the conduit above each blast opening.

2. In a material separating and grading machine, a casing having one wall thereof formed to provide an air pressure conduit, hoppers mounted in superimposed relation on the inner wall of said conduit and adjustable to vary the size of the entrance openings to said hoppers, the wall of the conduit immediately above each hopper being formed with a blast opening, means carried by the casing adjacent each hopper and adjustable with respect to the wall of the conduit to deliver the material in a line of travel directly across each blast opening, and means in the casing beyond the hoppers to receive material graded in accordance with weight.

3. In a machine for separating and grading material a casing having a series of hoppers arranged in superimposed relation and adjustable to vary the size of their entrance openings, means for directing a blast of air across the upper open end of each hopper, means arranged beyond each hopper for directing material forced by the blast beyond the hopper into the path of the blast of the next lowermost hopper, and material receiving hoppers arranged in the casing beyond such directing means.

In testimony whereof I have signed my name to this specification in the presence of two subscribing witnesses.

TOM PARKINSON.

Witnesses:
 THOMAS WILLIAM FORESTER,
 SYDNEY HEDWORTH.